United States Patent [19]

Spencer

[11] Patent Number: 5,140,848
[45] Date of Patent: Aug. 25, 1992

[54] PLASTIC LINER PIPE PENETRATION ADAPTER

[75] Inventor: John L. Spencer, Conroe, Tex.

[73] Assignee: Gundle Lining Construction Corporation, Houston, Tex.

[21] Appl. No.: 569,180

[22] Filed: Aug. 17, 1990

[51] Int. Cl.⁵ .................................................. G01M 3/26
[52] U.S. Cl. ................................................ 73/46; 156/64
[58] Field of Search ............... 73/46, 49.8, 49.2, 40; 156/64

[56] References Cited

U.S. PATENT DOCUMENTS 4,741,199  3/1988  Spencer ................................ 73/46

FOREIGN PATENT DOCUMENTS 2141041  2/1973  Fed. Rep. of Germany ....... 73/49.2
100727   6/1983  Japan ................................ 73/40
153136   9/1983  Japan ............................. 73/49.2
750304   7/1980  U.S.S.R. ......................... 73/49.2

Primary Examiner—Hezron E. Williams
Assistant Examiner—Joseph W. Roskos
Attorney, Agent, or Firm—Arnold, White & Durkee

[57] ABSTRACT

A plastic liner pipe penetration adapter designed for sealably penetrating a moisture impervious thermoplastic sheet or liner, particularly suitable for lining reservoirs, hazardous waste disposal sites, outdoor fluid containment areas and other similar applications, without damaging the sealing characteristics of the liner and which also allows field testing of the sealability of the liner after the installation of the adapter. In one embodiment, an inner tubular housing member defining a passage through the liner is inserted through a plate and connected thereto. An outer tubular housing member is coaxially aligned about the inner tubular housing member and sealably welded at a first end to the plate. An annular end piece is inserted over the inner tubular housing member in order to seal a second end of the outer tubular housing member to the inner tubular housing member, thereby creating a pressure test chamber between the tubular housing members and the annular end piece. A pressure test port is installed in the outer tubular housing member so that the seals created by the welding can be pressure tested by pressurizing the pressure test chamber. A flexible skirt is sealably attached at an inner edge to the plate, and at an outer edge to the liner.

14 Claims, 4 Drawing Sheets

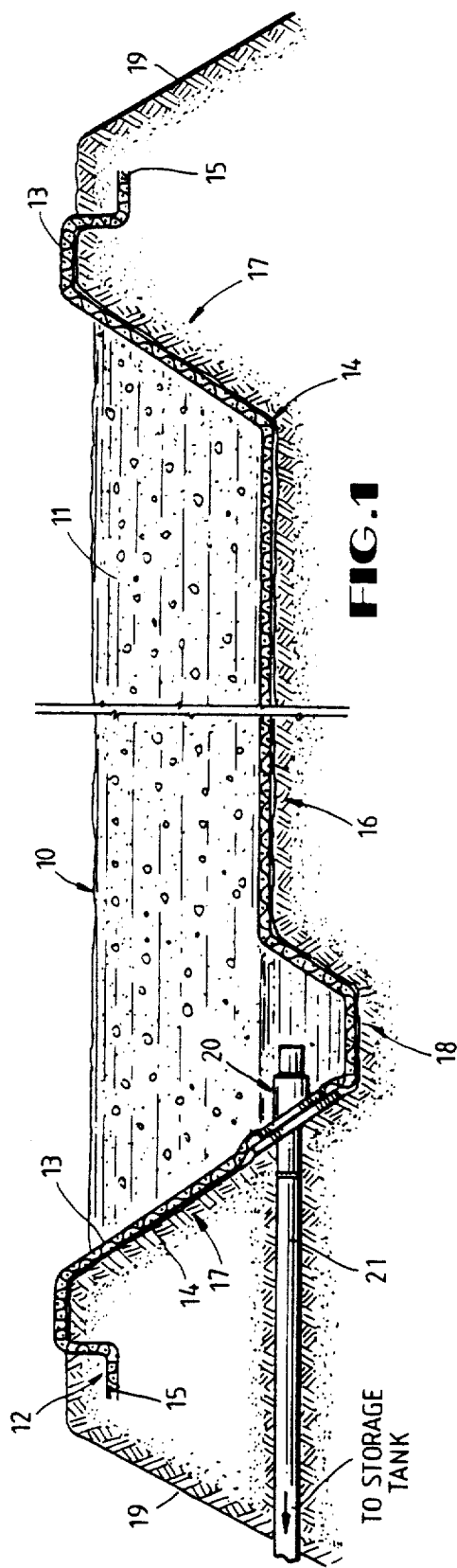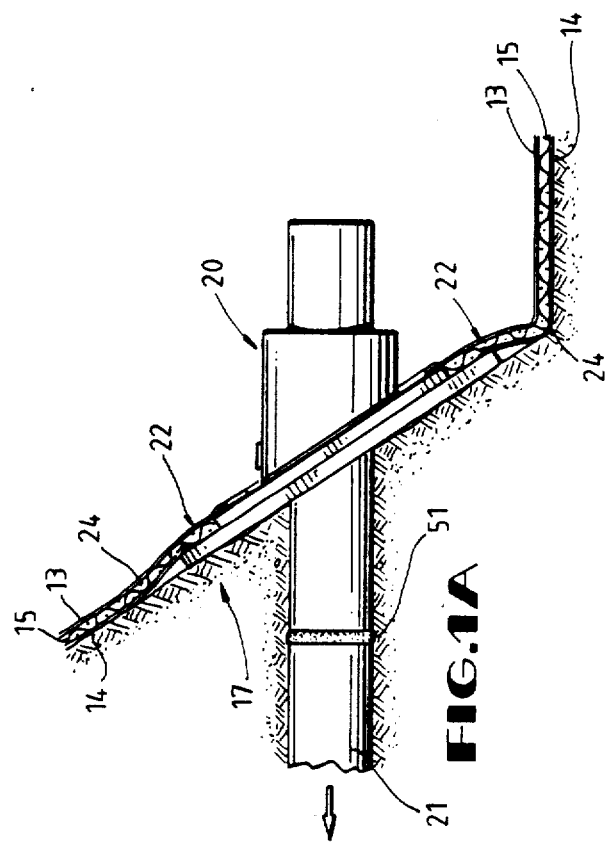

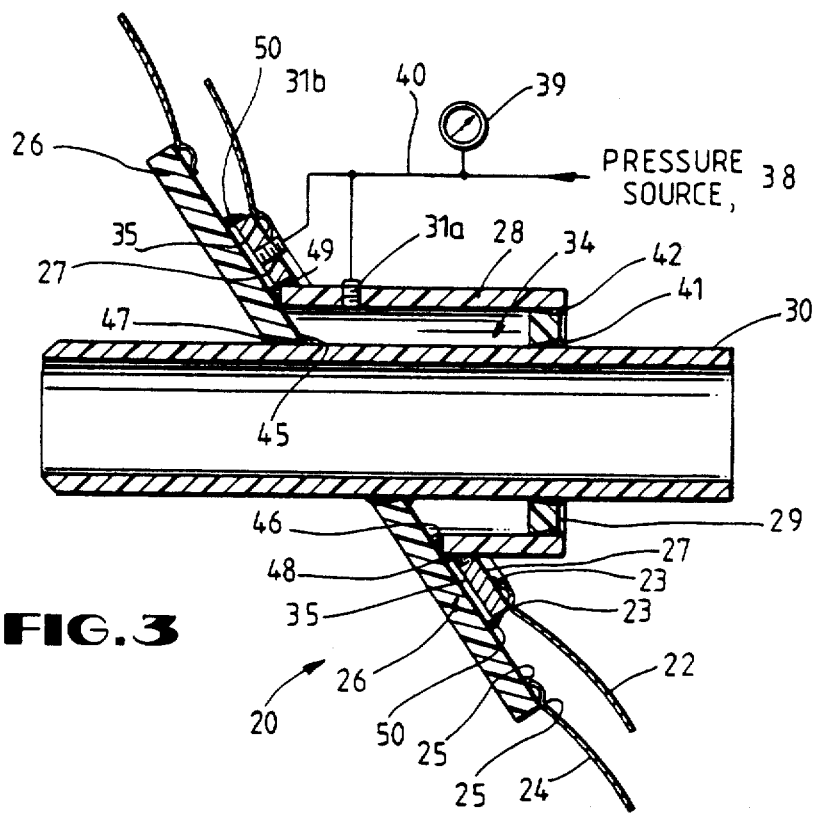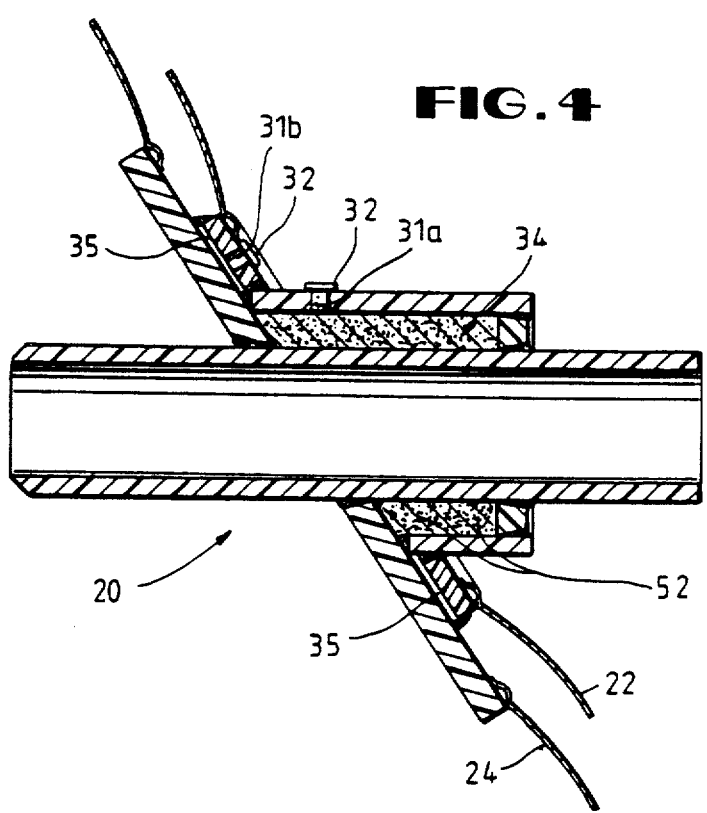

PLASTIC LINER PIPE PENETRATION ADAPTER

BACKGROUND OF THE INVENTION

This invention relates to a method and apparatus for sealably penetrating a moisture impervious thermoplastic sheet or liner, particularly suitable for lining reservoirs, hazardous waste disposal sites, outdoor fluid containment areas and other similar applications, without damaging the sealing characteristics of the liner. Specifically, the present invention relates to a plastic liner pipe penetration adapter designed in such a way as to also allow field testing of the sealability of the liner after the installation of the adapter.

Thermoplastic sheets or films have been utilized for environmental pollution control as a water barrier for the building of ponds, reservoirs, lagoons, landfills and as a soil sealant for hazardous or nuclear waste by laying the plastic sheeting along the ground with the seams welded or cemented by known methods. Various bentonite-containing sheet barriers also exist for use as liners for extremely large areas such as ponds, lagoons and hazardous waste sites.

Landfills, lagoons or other waste ponds are typically constructed by excavating land to create a reservoir area. If desired, berms can then be built around the perimeter of the reservoir area to extend the walls of the reservoir above ground level. Quite often, the landfill, lagoon or waste site is next lined with a layer of clay to serve as a barrier. Additionally, the excavated area can be graded in such a way as to create a declination towards one corner, end or area of the excavation.

Next, a thermoplastic liner is installed by, for example, placing flexible plastic sheets over the entire surface of the reservoir soil and berm area in an overlapping or abutting fashion, and then welding or cementing the sheets together to create a water impermeable liner. An exemplary method of welding plastic materials, such as plastic sheeting, is set forth in U.S. Pat. No. Re. 32,103 assigned to Gundle Lining Systems Inc.

The plastic sheets used for lining waste sites, ponds or lagoons are typically constructed out of a plastic material, such as polyethylene. Such plastic sheeting is available in varying thickness, width, and length. For example, Gundle Lining Systems, Inc., Houston, Tex. provides 250 foot long rolls of 100 mil thick, 22.5 feet width, high density polyethylene plastic sheeting under the label "Gundline HD" for use in such liner applications.

Next, if desired, a layer of heavy plastic netting, such as, "Gundnet" or "Geonet", or another filler material is placed on top of the liner sheeting and a second layer of plastic sheeting can be installed. The plastic netting or filler material serves to separate the two plastic sheeting layers.

The liner can then be covered, if desired, with a protective layer of earth to provide protection of the liner from puncturing and to help keep the liner in place. The waste, liquid, sludge material or the like is then placed on top of the plastic sheeting which is lining the reservoir, lagoon or pond.

As an additional step prior to covering the liner and introducing the waste material, pipes can be adapted to extend through the liner or liners to facilitate the collection and movement of the contained wastes from the lined containment area to a storage tank or other storage area. The pipe, such as plastic pipe, is inserted at desired locations in the liner. For example, the pipe is typically inserted horizontally through the sidewalls of the liner at the lowest point in the pond or reservoir. However, the insertion of pipe through the liner can damage or potentially damage the seal created by the liner. Particularly where hazardous wastes are involved, even the potentiality of any leak in the plastic liner of the waste pond will cause concern that the liner is not functioning properly. Thus, the ability to test and verify the sealability of the liner at the location of the pipe insertion is of considerable importance, both prior to and after the waste is first introduced into the liner. For example, state environmental regulations, such as those of Pennsylvania, require the testing of the joints formed where pipe penetrates through the waste liner.

Pipe penetration systems have been employed in liners in the past where a "pipe boot" is inserted through the liner and is then welded to the liner. This pipe boot serves as a sleeve for longer lengths of pipe which may be inserted therethrough and sealed thereto. The pipe boot resembles a "top hat" in that it comprises a short length of liner formed into a tube serving as the sleeve portion. One end of this tubular liner is flanged at such an angle to allow the remaining sleeve portion of the pipe boot to remain parallel to the liner sidewall it passes through. A square skirt of additional plastic liner material, having a width larger than the diameter of the flanged end of the tubular liner, is then cut so that it has an opening through its center slightly larger than the outer diameter of the tubular liner used for the pipe boot. This square skirt is then inserted over the tubular liner until it abuts the flanged end of the tubular liner. The skirt is then welded on one side to the sleeve portion of the tubular liner, and also on the other side to the flanged portion of the tubular liner. The flanged end of the pipe boot is then placed on the side of the liner which will contact the waste, and aligned over an opening in the liner of approximately the same size as the skirt portion of the pipe boot. The skirt portion of the pipe boot is then welded to the liner using known techniques. Plastic pipe can then be inserted through the sleeve of the pipe boot and then welded, clamped or otherwise sealed to the sleeve.

Use of the pipe boot configuration described above creates difficulties in testing and verifying the integrity and soundness of the seal or seals created between the pipe boot, skirt and the liner or liners, as well as, the seal created between the sleeve portion of the pipe boot and the pipe extending therethrough. Efforts have been made to field test the seals created in the pipe boot configuration. However, such efforts have been unsuccessful in that there is no practical way to apply pressure to the seals in order to test their intactness. For example, attempts have been made to build a dam around the installed pipe boot, and then to fill the dam with water to create a pressure head around the seals; however, this method did not work. Further attempts to test the pipe boot seals resulted in damage to the pipe boot itself.

Furthermore, it is difficult to visually detect any tears, rips, cracks, perforations, punctures or other potential leak forming channels in the seal areas around the pipe boot.

In accordance with the present invention, a method and apparatus are provided which will allow for penetrating a moisture impervious thermoplastic sheet or liner, particularly suitable for lining reservoirs, hazardous waste disposal sites, outdoor fluid containment areas and other similar applications, with a pipe penetration adapter without damaging the sealing characteristics of the liner, and in such a way as to also allow field testing of the sealability of the liner after the installation of the adapter.

SUMMARY OF INVENTION

The present invention addresses the problems described above by providing a method and apparatus for inserting pipe through the plastic liner utilized to line reservoirs, hazardous waste disposal sites and the like. The invention generally comprises a plastic liner pipe penetration adapter designed for sealably penetrating a moisture impervious thermoplastic sheet or liner without damaging the sealing characteristics of the liner while also allowing field testing of the integrity of the liner seal surrounding the adapter.

In a preferred embodiment of the invention, a thermoplastic liner is described for outdoor fluid containment areas. These containment areas typically have inclined portions forming the sidewalls and planar portions covering the bottom. The thermoplastic liner is sufficiently flexible to conform to the containment area. In this embodiment, a pipe penetration adapter is sealed to the thermoplastic liner in order to pipes to enter into the containment area through the thermoplastic liner in order to transport the contained wastes to another location. The adapter includes a testing structure for defining a fluid space to enable the integrity of the seal formed between the adapter and the liner to be tested.

In another preferred embodiment, the pipe penetration adapter is designed for use in penetrating a double liner configuration. In this embodiment, the adapter contains a lower plate defining an aperture. The adapter also has an upper plate defining an aperture having a diameter larger than the lower plate aperture diameter. Preferably, the lower plate has a larger width than the upper plate. The upper plate is sealably connected along its outer edges to the lower plate such that the upper plate does not contact the lower plate except at the outer edges of the upper plate.

The adapter utilized in the double liner configuration also comprises an annular end piece, or ring, having an inner diameter and an outer diameter. The adapter also contains an inner tubular housing member for defining a passage through the plastic liners. The inner tubular housing member has an outer diameter smaller than the lower plate aperture diameter, the upper plate aperture diameter and the annular end piece inner diameter. The inner tubular housing member extends through the lower plate aperture, the upper plate aperture and the annular end piece. The inner tubular housing member is sealably attached to the lower plate and the annular end piece.

The double liner adapter further comprises an outer tubular housing member having a first end and a second end, an inner diameter larger than the inner tubular housing member outer diameter and the annular end piece outer diameter, and an outer diameter smaller than the upper plate aperture diameter. The outer tubular housing member is coaxially aligned with the inner tubular housing member. The outer tubular housing member first end is sealably connected to the lower plate and the upper plate such that an inter-plate pressure test chamber is created within the boundaries defined by the area between the outer diameter of the outer tubular housing member, the upper plate and the lower plate. The inner diameter of the outer tubular housing member second end is sealably connected to the annular end piece outer diameter such that a tubular pressure test chamber is created within the boundaries defined by the area between the outer tubular housing member inner diameter, the inner tubular housing member outer diameter, the annular end piece and the lower plate.

The double liner adapter also is equipped with a pressure test port extending through the outer tubular housing member to provide for the introduction of fluid pressure into the tubular pressure test chamber. The test port includes a pressure test valve, much like the valve on an innertube, and preferably manufactured out of plastic. This valve can then be welded to the pressure test chamber. Similarly, the adapter has a pressure test port extending through the upper plate to provide for the introduction of fluid pressure into the inter-plate pressure test chamber. Once the pressure testing of the adapter is complete, it is preferred to remove the pressure test valves and sealably patch the test ports.

The adapter unit in the double liner configuration also includes a primary skirt, preferably manufactured out of the same material as the thermoplastic liner, that is sealably attached to the outer edges of the upper plate. Similarly, a secondary skirt is sealably attached to the outer edges of the lower plate. These skirts are sealably attached to the adapter prior to the installation of the adapter into a liner. The outer edges of the skirts can then be sealably attached, or welded to the respective liner layers using the same techniques that are used to weld or attach the liner sheets together.

In another preferred embodiment, the pipe penetration adapter is designed for use in penetrating a single liner configuration. In this embodiment, much like the adapter described above for the double liner configuration, the adapter contains a lower plate defining an aperture. In this embodiment, however, the adapter does not utilize an upper plate.

The single liner adapter also comprises an annular end piece, or ring, having an inner diameter and an outer diameter, and an inner tubular housing member for defining a passage through the plastic liner. The inner tubular housing member has an outer diameter smaller than the lower plate aperture diameter and the annular end piece inner diameter. The inner tubular housing member extends through the lower plate aperture and the annular end piece. The inner tubular housing member is sealably attached to the lower plate and the annular end piece.

The adapter in the single liner configuration further comprises an outer tubular housing member having a first end and a second end and an inner diameter larger than the inner tubular housing member outer diameter and the annular end piece outer diameter. The outer tubular housing member is coaxially aligned with the inner tubular housing member. The outer tubular housing member first end is sealably connected to the lower plate. The inner diameter of the outer tubular housing member second end is sealably connected to the annular end piece outer diameter such that a tubular pressure test chamber is created within the boundaries defined by the area between the outer tubular housing member inner diameter, the inner tubular housing member outer diameter, the annular end piece and the lower plate.

Much like the double liner adapter, the single liner configuration adapter also is equipped with a pressure test port extending through the outer tubular housing member to provide for the introduction of fluid pressure into the tubular pressure test chamber. The test port includes a pressure test valve, preferably manufactured out of plastic. This valve can then be welded to the pressure test chamber. Once the pressure testing of the adapter is complete, it is preferred to remove the pressure test valve and sealably patch the test port.

The adapter unit utilized in the single liner configuration also includes a skirt, preferably manufactured out of the same material as the thermoplastic liner, that is sealably attached to the outer edges of the lower plate. This skirt is attached to the adapter prior to the installation of the adapter into a liner. The outer edges of the skirt can then be welded to the liner using the same techniques that are used to weld or attach the liner sheets together.

In another preferred embodiment, the penetration with pipe of a moisture impervious thermoplastic sheet or liner, particularly suitable for lining reservoirs, hazardous waste disposal sites, outdoor fluid containment areas and other similar applications, is accomplished with a pipe penetration adapter without damaging the sealing characteristics of the liner, and in such a way as to also allow field testing to verify the integrity of the seal where the pipe penetrates the liner. The soil or excavated containment area to be waterproofed is covered with a plurality of flexible plastic sheets. The sheets are then aligned in an overlapping or abutting fashion to create a seam region between adjoining sheets. The adjoining or abutting sheets are next permanently joined by techniques such as welding or cementing, in order to provide a continuous and uninterrupted barrier of plastic facing the area from which water or other contaminant is to be barred. The outer edge of the permanently joined sheets, or thermoplastic liner is then fixedly attached to the ground. A plastic pipe penetration adapter as described herein is then installed into the plastic sheets, at a desired location in the containment area. The adapter contains a testing structure for defining a fluid space to enable the seal between the adapter and the liner to be tested. The integrity of the seal between the sheets and the pipe penetration adapter is then tested by engaging fluid pressure into the testing structure for a desired length of time, after which time the fluid pressure is disengaged and the pressure testing structure is sealed. This method can be employed to test the seal created between the adapter and the liner, irrespective of whether the double liner or single liner configuration is used to line the containment area.

In yet another preferred embodiment, a bentonite material, or other suitable filler material can be introduced into the tubular pressure test chamber of the adapter used for either the single liner or double liner configuration after completion of the testing in order to act as an additional barrier against any potential leakage in the adapter. The pressure test chamber is then sealed to contain the bentonite material.

In yet another preferred embodiment, a waste containment area is constructed with a bottom area graded to slope to toward a collection area. The containment area is then lined with a double liner. The secondary liner of flexible plastic sheeting is installed against the soil of the containment area. Next, a layer of heavy plastic netting or other suitable filler is placed on top of the secondary liner. The primary liner of flexible sheeting layer is then installed. In this embodiment, the spacing between the secondary liner and the primary liner is increased in the collection area such that a single liner pipe penetration adapter can be installed into the secondary liner to enable any waste leakage into this interliner area between the primary and secondary liners to be detected and removed. Additionally, in this embodiment, a double liner pipe penetration adapter can be installed through the primary and secondary liners to facilitate the removal of waste material from the containment area above the primary liner to another storage area.

While the invention will be described in conjunction with specific embodiments thereof, it will be understood that it is not intended to limit the invention to that embodiment and procedure. On the contrary, it is intended to cover all alternatives, modifications and equivalents as may be included within the spirit of the invention as defined by the appended claims.

BRIEF DESCRIPTION OF THE DRAWINGS

FIG. 1 is a sectional view of a hazardous waste disposal pond, reservoir or lagoon utilizing a pipe penetration adapter in accordance with one embodiment of the present invention.

FIG. 1A is an enlarged sectional view of a pipe penetration adapter in a hazardous waste disposal pond, reservoir or lagoon in accordance with one embodiment of the present invention.

FIG. 3 is a sectional view of the installed pipe penetration adapter depicted during the leak testing mode in accordance with one embodiment of the present invention.

FIG. 4 is a sectional view of the installed pipe penetration adapter depicted during the operational mode of the waste pond after the completion of testing in accordance with one embodiment of the present invention.

DETAILED DESCRIPTION OF THE PREFERRED EMBODIMENT

Figure 2:
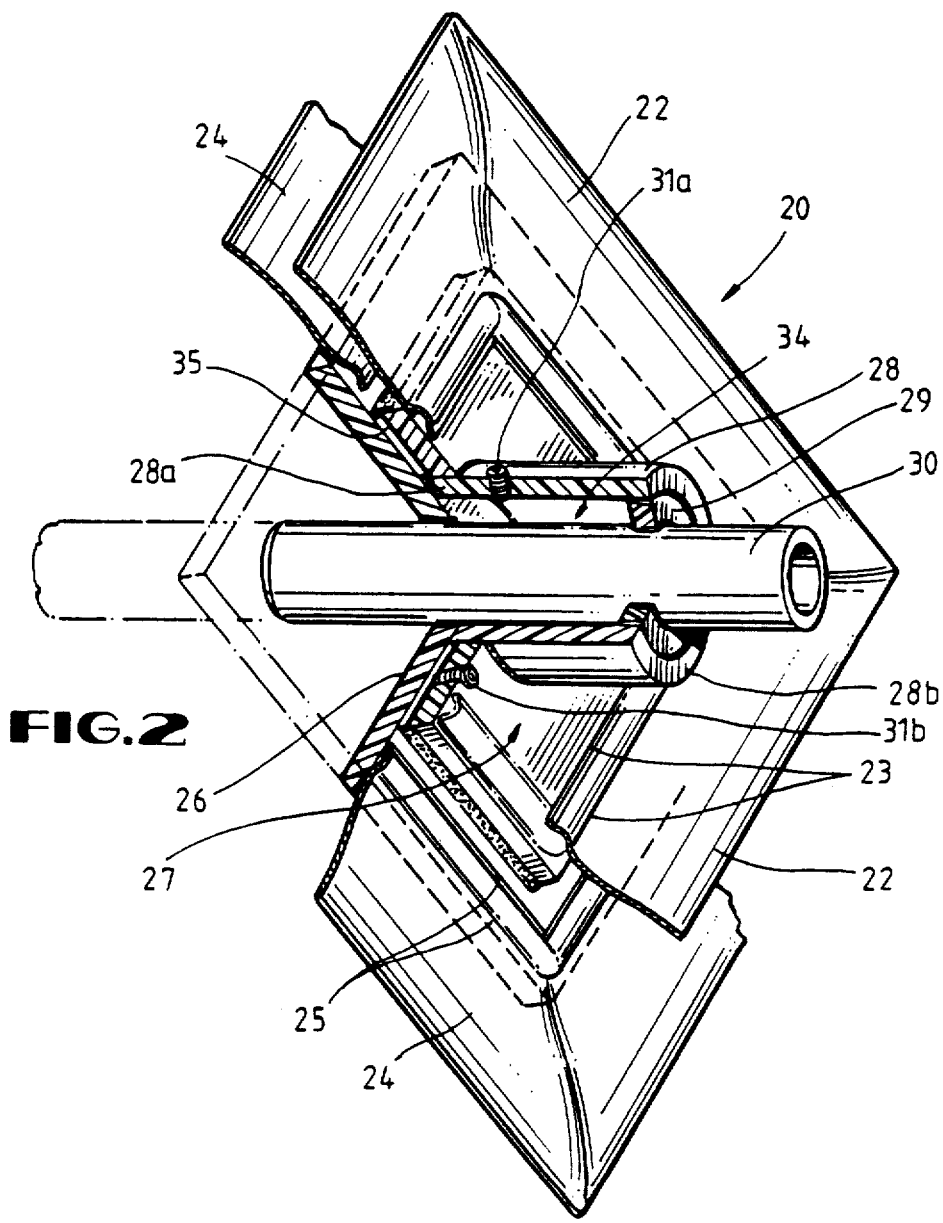
FIG. 2 is a cut-away view of the pipe penetration adapter in accordance with one embodiment of the present invention.

Referring to FIG. 1, there is shown a hazardous waste site or outdoor fluid containment area utilizing the products and methods of the present invention. Hazardous waste site or containment area 10 may contain any number of contaminants and water soluble pollutants. It may be a liquid as shown or a sludge or a solid. The soil 12 is any type of porous soil or soil which one desires to protect from contamination. The outdoor fluid containment area 10 typically has a planar bottom 16, inclined sidewalls 17 and a berm area 19. The containment area 10 is lined with a primary water impermeable flexible plastic sheet or thermoplastic liner 13. The hazardous waste solution or fluid 11 contacts the primary water impermeable flexible plastic sheet or thermoplastic liner 13 constructed in accordance with the present invention. The containment area 10 can also be lined with a secondary water impermeable flexible plastic sheet or thermoplastic liner 14. When both the secondary liner 14 and the primary liner 13 are used, a heavy plastic netting 15, such as "Geonet," "Gundnet," or other suitable filler material is placed between the primary liner 13 and the secondary liner 14 to serve as a spacer. The containment area 10 can be graded such that the bottom 16 slopes towards a collection area 18.

The flexible plastic sheeting 13 and 14 of this invention can be employed to waterproof an area of soil. The soil to be waterproofed is covered with a plurality of the flexible plastic sheets 14. The sheets 14 are then aligned in an overlapping or abutting fashion to create a seam region between adjoining sheets. The adjacent surfaces of the overlapping or abutting sheets are roughened to increase adherence of cement or molten plastic used for the seams. Finally, the overlapping or abutting sheets are permanently joined by techniques such as welding or cementing, in order to provide a continuous and uninterrupted water impervious barrier of plastic facing the area from which water is to be barred. The outer edge of the permanently joined sheets, or thermoplastic liner 14 is then secured to the ground around the perimeter of the thermoplastic liner 14 by known methods, such as, for example, burying the outer edge beneath the ground, embedding the outer edge within a wall of concrete surrounding the perimeter of the thermoplastic liner 14, or by other mechanical means of attachment, such as, constructing a concrete ring wall around the perimeter of the containment area 10 and then attaching the outer edges of the thermoplastic liner 14 using standard techniques. An additional layer of sheeting material 13 can be installed in similar fashion to create a double liner. When such additional layer of sheeting is employed, a heavy plastic netting, such as "Geonet," or "Gundnet," 15 or other suitable filler material is placed on top of the secondary liner 14 prior to installing the primary liner 13.

A pipe penetration adapter 20 can be installed through the single liner or double liner in the collection area or other desired location of the containment area. The adapter 20 can then be sealably attached to the liner and then sealably connected with pipe 21 such that the contents of the containment area 10 can be transported to another location, such as a storage tank.

Referring now to FIG. 1A, there is shown an enlarged sectional view of a pipe penetration adapter 20 shown extending through the primary liner 13, the secondary liner 14, and into the sidewall 17 of the containment area to enable the transport of waste solution through the pipe penetration adapter and into an attached pipe 21 which extends to another location such as a storage tank. The adapter 20 is sealably connected to the primary liner 13 and the secondary liner 14 by welding the outer edge of the primary skirt 22 to the primary liner 13 and welding the outer edge of the secondary skirt 24 to the secondary layer 14 using known welding techniques such as extrusion welding. Plastic pipe 21 can be sealably attached to the adapter 20 by known techniques such as welding to form a welded seal 51.

Referring now to FIG. 2, a cut away view of the pipe penetration adapter 20 in accordance with the present invention is shown as it is constructed prior to its installation in the field. The pipe penetration adapter 20 is comprised of an inner tubular housing member 30 for defining a passage through the plastic liner or liners of the containment area. A lower plate 26 having an aperture with a diameter larger than the outer diameter of the inner tubular housing member 30, is inserted over the inner tubular housing member 30 and welded thereto. An outer tubular housing member 28, having a first end 28a and a second end 28b, and having an inner diameter larger than the outer diameter of the inner tubular housing member 30, is coaxially aligned over the inner tubular housing member 30 and sealably welded at the first end 28a to the lower plate 26. An annular end piece 29, having an inner diameter greater than the outer diameter of the inner tubular housing member 30, and having an outer diameter less than the inner diameter of the outer tubular housing member 28, is inserted over the inner tubular housing member 30 and serves as a means for sealing the second end 28b of the outer tubular housing member 28 to the inner tubular housing member 30 by standard welding techniques, such that a tubular pressure test chamber 34 is created within the space defined by the inner diameter of the outer tubular housing member 28, the annular end piece 29, the outer diameter of the inner tubular housing member 30, and the lower plate 26. An upper plate 27, preferably of a width smaller than the width of the lower plate 26, and having an aperture cut out larger than the outer diameter of the outer tubular housing member 28, is then inserted over the outer tubular housing member 28, and welded to the outer tubular housing member 28 and the lower plate 26 using standard welding techniques such that an inter-plate pressure test chamber 35 is created. Pressure test ports 31a and 31b are installed in both the outer tubular housing member 30 and the upper plate 27 so that the seals created by the welding can be pressure tested by pressurizing the tubular pressure test chamber 34, and the inter-plate pressure test chamber 35. A primary skirt 22, preferably constructed out of the flexible plastic liner material used to line the containment area, is sealably attached to the outer edges of the upper plate 27 by known welding techniques. Similarly, a secondary skirt 24, preferably constructed out of the flexible plastic liner material used to line the containment area, is sealably attached to the outer edge of the lower plate 26 using known welding techniques.

In another embodiment of the present invention, if only one flexible plastic liner layer is utilized to line the containment area, then the pipe penetration adapter 20, as described above, can be modified by eliminating the use of the upper plate 27, and the skirt 22. In this embodiment, the sealability is tested at the pressure test port 31a by pressurizing the tubular pressure test chamber 34.

Referring again to FIG. 1, in a preferred embodiment, the pipe penetration adapter 20 is located along the sidewall 17 of the containment area 10. Referring also to FIG. 2, in this preferred embodiment, the pipe penetration adapter is designed such that the inner tubular housing member 30 remains horizontal with respect to the containment area.

Figure 2A:
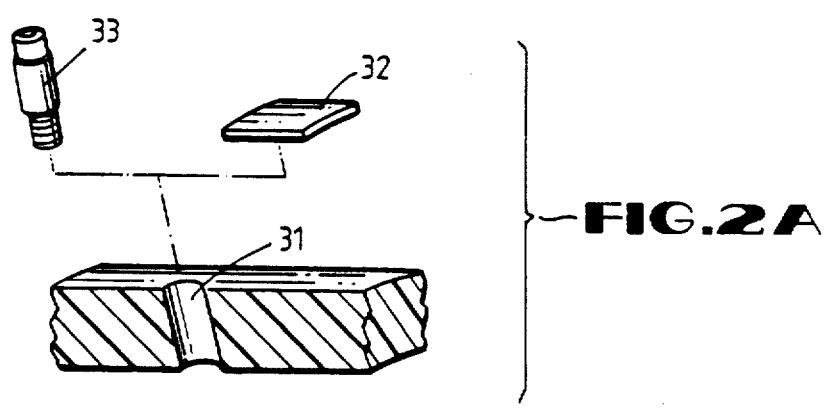
FIG. 2A is an enlarged sectional view of a pressure testing port on the pipe penetration adapter in accordance with one embodiment of the present invention.

Referring now to FIG. 2A, an enlarged sectional view of the pressure test port 31 is shown. This pressure test port 31 is comprised of a plastic pressure test valve 33 fixably mounted or welded through the wall surrounding the chamber to be pressure tested. For example, referring to FIGS. 2 and 2A, pressure test port 31a extends through the wall of the outer tubular housing member 28 and into the tubular pressure test chamber 34 thereby allowing a pressure source to exert a pressure on the tubular pressure test chamber 34 in order to test the seal created by the welds between the annular end piece 29, the outer tubular housing member 28, the inner tubular housing member 30 outer diameter, and the lower plate 26. Similarly, pressure test port 31b extends through the wall of the upper plate 27 and into the inter-plate pressure test chamber 35 so that a pressure source can pressurize the inter-plate pressure test chamber 35 to test the seals created by the welds between the lower plate 26, the upper plate 27, and the outer tubular housing member 28 outer diameter. When such testing is completed, the pressure test valve 33 can be removed and the pressure test port can be sealingly enclosed with a patch 32, for example, by using known welding techniques.

Referring now to FIG. 3, an enlarged sectional view of the installed pipe penetration adapter 20 is depicted in the leak testing mode in accordance with the present invention. A pressure source 38 is applied to pressure test ports 31a and 31b by way of pressure test lines 40. Additionally, a pressure indicating valve 39 can be inserted into the pressure test lines 40 at a desired location or locations to facilitate the monitoring of the pressure during the pressure test of either the tubular pressure test chamber 34 or the inter-plate pressure test chamber 35.

Pressurization of the tubular pressure test chamber 34 by way of test port 31a allows testing of the weld 41 between the inner tubular housing member 30 and the annular end piece 29. Additionally, the weld 42 between the annular end piece 29 and the outer tubular housing member 28 is tested. Furthermore, the pressurization tests the welds 45 and 47 between the inner tubular housing member 30 and the lower plate 26. Finally, when applying pressure to the tubular pressure test chamber 34, the weld 46 between the outer tubular housing member 28 and the lower plate 26 is tested.

When applying pressure source 38 to the inter-plate pressure test chamber 35 by way of test port 31b, the weld 49 between the outer tubular housing member 28 and the upper plate 27 is tested. When applying this pressure, the weld 48 between the outer tubular housing member 28, the lower plate 26 and the upper plate 27 is also tested. Furthermore, when applying this pressure, the weld 50 between the upper plate 27 and the lower plate 26 is tested.

Additionally, referring to FIGS. 2 and 3, pressure tests can be run on the welds 23 and 25 used to sealingly attach the skirts 22 and 24 to the plates 27 and 26, respectively, by using a conventional vacuum box.

Referring now to FIG. 4, a sectional view of the installed pipe penetration adapter 20 is depicted in the operational mode of the waste pond after the completion of testing in accordance with the present invention. Once the pressure testing has been completed, patches 32 are sealably mounted or welded over the pressure test ports 31a and 31b to seal off the tubular pressure test chamber 34 and the inter-plate pressure test chamber 35. In a preferred embodiment, a bentonite material 52 is pumped into the tubular pressure test chamber 34 prior to the patch 32 being placed over pressure test port 31a. The bentonite, or other suitable filler, serves as an additional barricade to any potential leaking of the seam areas in the pipe penetration adapter 20.

Figure 5:
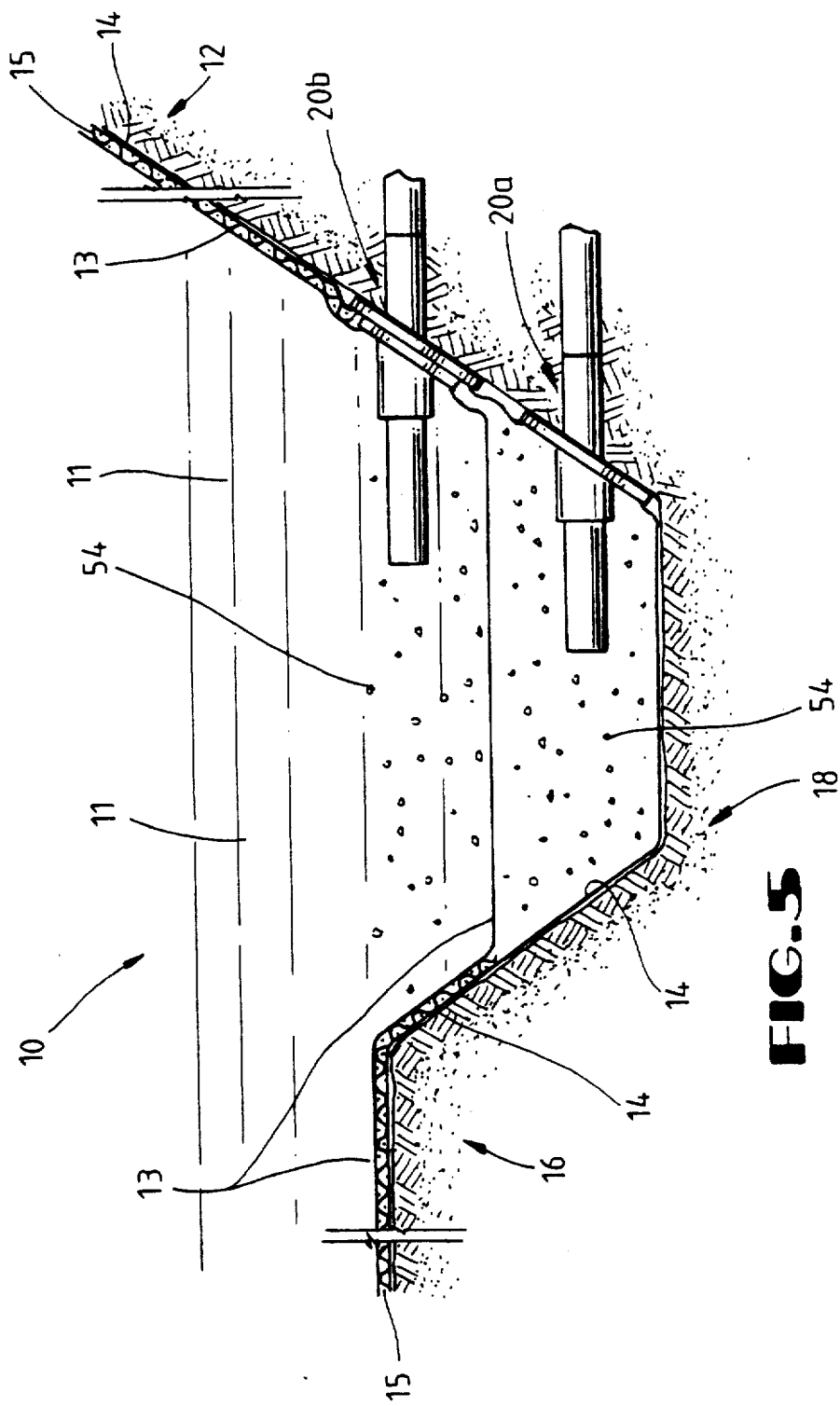
FIG. 5 is an enlarged sectional view of the collection area of a waste containment pond utilizing a double liner pipe penetration adapter and a single liner pipe penetration adapter in accordance with one embodiment of the present invention.

Referring now to FIG. 5, an enlarged sectional view of the collection area of a waste containment pond is depicted utilizing a double liner pipe penetration adapter and a single liner pipe penetration adapter in accordance with another preferred embodiment of the present invention. In this embodiment, a waste containment area 10 is constructed with a bottom area 16 graded to slope to toward a collection area 18. The containment area 10 is then lined with a double flexible plastic liner 13 and 14. A secondary liner of flexible plastic sheeting 14 is installed against the soil 12 of the containment area 10. Next, a layer of heavy plastic netting 15 or other suitable filler is placed on top of the secondary liner 14 to act as an interstitial spacer between the secondary liner and another liner layer. A primary liner of flexible sheeting 13 is then installed on top of the netting layer 15, such that an interstitial spacing remains between the secondary liner 14 and primary liner 15 sufficient to permit any fluid or waste leacheate present in the interstitial space to flow toward the collection area 18 of the containment pond. In this embodiment, the spacing between the secondary liner 14 and the primary liner 13 is increased in the collection area 18 such that a single liner pipe penetration adapter 20a can be installed into the secondary liner 14 to enable any waste leakage into this interstitial area between the primary and secondary liners to be detected and removed without damaging the integrity of the liner seal around the adapter. Gravel 54 or other suitable porous matrix material is added to the collection area 18 of the liner 13 an 14 both in the interstitial space and also on top of the primary layer 13 to support and stabilize the primary liner 13 and to act as a fluid filtration system. Additionally, in this embodiment, a double liner pipe penetration adapter 20b can be installed through the primary liner 13 and secondary liner 14 to facilitate the removal of waste material 11 from the containment area above the primary liner 13 to another storage area.

Thus it is apparent that there has been provided, in accordance with the invention, a method and product that fully satisfies the objects, aims, and the advantages set forth above. While the invention has been described in conjunction with specific embodiments thereof, it is evident that many alternatives, modifications and variations will be apparent to those skilled in the art in light of the foregoing description. For example, while the adapter 20 has been described as a fabricated part, all or part of the adapter 20 could also be made by molding techniques. Accordingly, it is intended to embrace all such alternatives, modifications and variations as fall within the spirit and broad scope of the appended claims.

I claim:

1. A thermoplastic linear for outdoor fluid containment areas having inclined portions forming the sidewalls of said containment area and planar portions covering the bottom of said containment area comprising:
    a thermoplastic liner sufficiently flexible to conform to the containment area; and
    a pipe penetration adapter sealed to said thermoplastic liner, comprising (a) one or more sealed pressure testing chambers and (b) valve means coupled to said chambers for enabling the pressure testing of one or more seals of said chambers.

2. A thermoplastic liner as in claim 1, wherein said pipe penetration adapter further comprises:
    a lower plate defining an aperture having a diameter, said lower plate having outer edges;
    an upper plate defining an aperture having a diameter larger than said lower plate aperture diameter, said upper plate having outer edges and being sealably connected at said outer edges to said lower plate such that said upper plate does not contact said lower plate except at said upper plate outer edges;
    an annular end piece having an inner diameter and an outer diameter;
    an inner tubular housing member for defining a passage through the plastic liner, said inner tubular housing member having an outer diameter smaller than said lower plate aperture diameter, said upper plate aperture diameter and said annular end piece inner diameter, said inner tubular housing member extending through said lower plate aperture, said upper plate aperture and said annular end piece, and said inner tubular housing member being sealably attached to said lower plate and said annular end piece;

an outer tubular housing member having a first end and a second end, an inner diameter larger than said inner tubular housing member outer diameter and said annular end piece outer diameter, and an outer diameter smaller than said upper plate aperture diameter, said outer tubular housing member being coaxially aligned with said inner tubular housing member, said outer tubular housing member first end being sealably connected to said lower plate and said upper plate such that an inter-plate pressure test chamber is created within the boundaries defined by the area between said outer tubular housing member outer diameter, said upper plate and said lower plate, said inner diameter of said outer tubular housing member second end being sealably connected to said annular end piece outer diameter such that a tubular pressure test chamber is created within the boundaries defined by the area between said outer tubular housing member inner diameter, said inner tubular housing member outer diameter, said annular end piece and said lower plate;

a pressure test port extending through said outer tubular housing member to provide for the introduction of fluid pressure into said tubular pressure test chamber;

a pressure test port extending through said upper plate to provide for the introduction of fluid pressure into said inter-plate pressure test chamber;

a primary skirt sealably attached to said upper plate outer edges; and a secondary skirt sealably attached to said lower plate outer edges.

3. A thermoplastic liner as in claim 1, wherein said pipe penetration adapter further comprises:

a lower plate defining an aperture having a diameter, said lower plate having outer edges;

an annular end piece having an inner diameter and an outer diameter;

an inner tubular housing member for defining a passage through the plastic liner, said inner tubular housing member having an outer diameter smaller than said lower plate aperture diameter and said annular end piece inner diameter, said inner tubular housing member extending through said lower plate aperture, and said annular end piece, and said inner tubular housing member being sealably attached to said lower plate and said annular end piece;

an outer tubular housing member having a first end and a second end, and an inner diameter larger than said inner tubular housing member outer diameter and said annular end piece outer diameter, said outer tubular housing member being coaxially aligned with said inner tubular housing member, said outer tubular housing member first end being sealably connected to said lower plate, said inner diameter of said outer tubular housing member second end being sealably connected to said annular end piece outer diameter such that a tubular pressure test chamber is created within the boundaries defined by the area between said outer tubular housing member inner diameter, said inner tubular housing member outer diameter, said annular end piece and said lower plate;

a pressure test port extending through said outer tubular housing member to provide for the introduction of fluid pressure into said tubular pressure test chamber; and a skirt sealably attached to said lower plate outer edges.

4. A pipe penetration adapter for a thermoplastic liner for outdoor fluid containment areas comprising:

a lower plate defining an aperture having a diameter, said lower plate having outer edges;

an upper plate defining an aperture having a diameter larger than said lower plate aperture diameter, said upper plate having outer edges and being sealably connected at said outer edges to said lower plate such that said upper plate does not contact said lower plate except at said upper plate outer edges;

an annular end piece having an inner diameter and an outer diameter;

an inner tubular housing member for defining a passage through the plastic liner, said inner tubular housing member having an outer diameter smaller than said lower plate aperture diameter, said upper plate aperture diameter and said annular end piece inner diameter, said inner tubular housing member extending through said lower plate aperture, said upper plate aperture and said annular end piece, and said inner tubular housing member being sealably attached to said lower plate and said annular end piece;

an outer tubular housing member having a first end and a second end, an inner diameter larger than said inner tubular housing member outer diameter and said annular end piece outer diameter, and an outer diameter smaller than said upper plate aperture diameter, said outer tubular housing member being coaxially aligned with said inner tubular housing member, said outer tubular housing member first end being sealably connected to said lower plate and said upper plate such that an inter-plate pressure test chamber is created within the boundaries defined by the area between said outer tubular housing member outer diameter, said upper plate and said lower plate, said inner diameter of said outer tubular housing member second end being sealably connected to said annular end piece outer diameter such that a tubular pressure test chamber is created within the boundaries defined by the area between said outer tubular housing member inner diameter, said inner tubular housing member outer diameter, said annular end piece and said lower plate;

a pressure test port extending through said outer tubular housing member to provide for the introduction of fluid pressure into said tubular pressure test chamber;

a pressure test port extending through said upper plate to provide for the introduction of fluid pressure into said inter-plate pressure test chamber;

a primary skirt sealably attached to said upper plate outer edges; and a secondary skirt sealably attached to said lower plate outer edges.

5. A pipe penetration adapter for a thermoplastic liner for outdoor fluid containment areas comprising:
   a lower plate defining an aperture having a diameter, said lower plate having outer edges;
   an annular end piece having an inner diameter and an outer diameter;
   an inner tubular housing member for defining a passage through the plastic liner, said inner tubular housing member having an outer diameter smaller than said lower plate aperture diameter and said annular end piece inner diameter, said inner tubular housing member extending through said lower plate aperture, and said annular end piece, and said inner tubular housing member being sealably attached to said lower plate and said annular end piece;
   an outer tubular housing member having a first end and a second end, and an inner diameter larger than said inner tubular housing member outer diameter and said annular end piece outer diameter, said outer tubular housing member being coaxially aligned with said inner tubular housing member, said outer tubular housing member first end being sealably connected to said lower plate, said inner diameter of said outer tubular housing member second end being sealably connected to said annular end piece outer diameter such that a tubular pressure test chamber is created within the boundaries defined by the area between said outer tubular housing member inner diameter, said inner tubular housing member outer diameter, said annular end piece and said lower plate;
   a pressure test port extending through said outer tubular housing member to provide for the introduction of fluid pressure into said tubular pressure test chamber; and
   a skirt sealably attached to said lower plate outer edges.

6. A method for waterproofing an area of soil while sealably introducing pipe through the waterproofing, and verifying the integrity of the seal where the pipe is introduced, comprising the steps of:
   (a) covering the soil to be waterproofed with a plurality of flexible plastic sheets;
   (b) aligning said sheets in an overlapping or abutting fashion to create a seam region between adjoining sheets;
   (c) permanently joining said overlapping or abutting sheets by techniques such as welding or cementing, in order to provide a continuous and uninterrupted barrier of plastic facing the area from which water is to be barred;
   (d) installing a plastic pipe penetration adapter to said plastic sheets, said adapter containing a testing structure for defining a fluid space to enable the seal between said adapter and said liner to be tested;
   (e) testing the integrity of the seal between said sheets and said pipe penetration adapter by engaging fluid pressure into said testing structure for a desired length of time;
   (f) disengaging said fluid pressure; and
   (g) sealing said pressure testing structure.

7. The method of claim 6 comprising the further step of:
   (a) introducing a bentonite material, or other suitable filler material, into said testing structure after disengaging said fluid pressure and prior to sealing said pressure testing structure.

8. A pipe penetration adapter comprising: a plate attached at outer edges thereof to a first liner;
   an inner housing member projecting through the plate, and being sealably attached thereto;
   means, formed about a portion of the inner housing member adjacent to the plate, for defining a first pressure chamber, said first pressure chamber defining means being sealably attached to the inner housing member and the plate; and
   means for enabling pressure testing of one or more seals of the first chamber.

9. The apparatus of claim 8 which further comprises:
   means for defining a second pressure chamber, sealably attached to the first means, the plate and a second liner; and
   means for enabling pressure testing of one or more seals of the second chamber.

10. The apparatus of claim 9 wherein a second skirt is interposed between the second pressure chamber defining means and the second liner.

11. The apparatus of claim 8 wherein a first skirt is sealably interposesd between the plate and the first liner.

12. The apparatus of claim 8 wherein the first chamber contains a filler material.

13. A thermoplastic liner for outdoor fluid containment areas having inclined portions forming the sidewalls of said containment area and planar covering the bottom of said containment area comprising:
   a thermoplastic liner sufficiently flexable to conform to the containment area;
   a pipe penetration adapter sealed to said thermoplastic liner, said adapter comprising:
   a testing structure for defining a fluid space to enable the seal between said adapter and said liner to be tested;
   a lower plate defining an aperture having a diameter, said lower plate having outer edges;
   an upper plate defining an aperture having a diameter larger than said lower plate aperture diameter, said upper plate having outer edges and being sealably connected at said outer edges to said lower plate such that said upper plate does not contact said lower plate except at said upper plate outer edges;
   an annular end piece having an inner diameter and an outer diameter;
   an inner tubular housing member for defining a passage through the plastic liner, said inner tubular housing member having an outer diameter smaller than said lower plate aperture diameter, said upper plate aperture diameter and said annular end piece inner diameter, said inner tubular housing member extending through said lower plate aperture, said upper plate aperture and said annular end piece, and said inner tubular housing member being sealably attached to said lower plate and said annular end piece;
   an outer tubular housing member having a first end and a second end, an inner diameter larger than said inner tubular housing member outer diameter and said annular end piece outer diameter, and an outer diameter smaller than said upper plate aperture diameter, said outer tubular housing member being coaxially aligned with said inner tubular housing member, said outer tubular housing member first end being sealably connected to said lower plate and said upper plate such that an inter-plate pressure test chamber is created within the boundries defined by the area between said outer tubular housing member outer diameter, said upper plate and said lower plate, said inner diameter of said outer tubular housing member second end being sealably connected to said annular end piece outer diameter such that a tubular pressure test chamber is created within the boundries defined by the area between said outer tubular housing member inner diameter, said inner tubular housing member outer diameter, said annular end piece and said lower plate;

a pressure test port extending through said outer tubular housing member to provide for the introduction of fluid pressure into said tubular pressure test chamber;

a pressure test port extending through said upper plate to provide for the introduction of fluid pressure into said inter-plate pressure test chamber;

a primary skirt sealably attached to said upper plate outer edges; and a secondary skirt sealably attached to said lower plate outer edges.

14. A thermoplastic liner for outdoor fluid containment areas having inclined portions forming the sidewalls of said containment area and planar portions covering the bottom of said containment area comprising:

a thermoplastic liner sufficiently flexible to conform to the containment area; and a pipe penetration adapter sealed to said thermoplastic liner, said adapter comprising:

a testing structure for defining a fluid space to enable the seal between said adapter and said liner to be tested;

a lower plate defining an aperture having a diameter, said lower plate having outer edges;

an annular end piece having an inner diameter and an outer diameter;

an inner tubular housing member for defining a passage through the plastic liner, said inner tubular housing member having an outer diameter smaller than said lower plate aperture diameter and said annular end piece inner diameter, said inner tubular housing member extending through said lower plate aperture, and said annular end piece, and said inner tubular housing member being sealably attached to said lower plate and said annular end piece;

an outer tubular housing member having a first end and a second end, and an inner diameter larger than said inner tubular housing member outer diameter and said annular end piece outer diameter, said outer tubular housing member being coaxially aligned with said inner tubular housing member, said outer tubular housing member first end being sealably connected to said lower plate, said inner diameter of said outer tubular housing member second end being sealably connected to said annular end piece outer diameter such that a tubular pressure test chamber is created within the boundaries defined by the area between said outer tubular housing member inner diameter, said inner tubular housing member outer diameter, said annular end piece and said lower plate;

a pressure test port extending through said outer tubular housing member to provide for the introduction of fluid pressure into said tubular pressure test chamber; and a skirt sealably attached to said lower plate outer edges.

* * * * *

UNITED STATES PATENT AND TRADEMARK OFFICE
CERTIFICATE OF CORRECTION

PATENT NO. : 5,140,848
DATED : August 25, 1992
INVENTOR(S) : Spencer

It is certified that error appears in the above-indentified patent and that said Letters Patent is hereby corrected as shown below:

Column 3, line 25, delete "in order to " add --to allow--.

Signed and Sealed this

Twenty-eighth Day of September, 1993

Attest:

BRUCE LEHMAN

*Attesting Officer*          *Commissioner of Patents and Trademarks*